US007759271B2

(12) United States Patent
Prades et al.

(10) Patent No.: US 7,759,271 B2
(45) Date of Patent: Jul. 20, 2010

(54) ACTIVATING SUPPORTS FOR METALLOCENE CATALYSIS

(75) Inventors: Floran Prades, Nivelles (BE); Christophe Boisson, Tramoyes (FR); Roger Spitz, Lyons (FR); Abbas Razavi, Mons (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 615 days.

(21) Appl. No.: 10/587,058

(22) Filed: Jul. 21, 2006

(65) Prior Publication Data
US 2009/0042720 A1    Feb. 12, 2009

(51) Int. Cl.
C08F 4/02 (2006.01)
B01J 37/08 (2006.01)
B01J 37/14 (2006.01)
B01J 37/26 (2006.01)
B01J 31/22 (2006.01)

(52) U.S. Cl. .................. 502/107; 502/110; 502/117; 502/118; 502/132; 526/902; 526/943; 526/160; 526/907

(58) Field of Classification Search .................. None
See application file for complete search history.

(56) References Cited

U.S. PATENT DOCUMENTS 4,607,019 A * 8/1986 Best .......................... 502/119
6,239,059 B1 * 5/2001 Saudemont et al. ......... 502/120
6,548,442 B1   4/2003 Wittner et al.

FOREIGN PATENT DOCUMENTS

EP        1559730 A1     8/2005
EP        1709091 A2    10/2006
WO    WO/2005/075525    8/2005

OTHER PUBLICATIONS

J.J. Han et al., "Nascent morphology of syndiotactic polystyrene synthesized over silica-supported metallocene catalyst," Polymer v. 49, p. 4141-4149, Jul. 2008.*
M.P. McDaniel, "Supported Chromium Catalysts for Ethylene Polymerization," Advances in Catalysis v. 33, p. 70, Academic Press, London, 1985.*

* cited by examiner

*Primary Examiner*—Melvin C Mayes
*Assistant Examiner*—James Corno
(74) *Attorney, Agent, or Firm*—Bradley A. Misley

(57) ABSTRACT

The present invention relates to a process for preparing an activating support for metallocene complexes in the polymerisation of olefins comprising the steps of: I) providing a support prepared consisting in particles formed from at least one porous mineral oxide; II) optionally fixing the rate of silanols on the surface of the support; III) functionalising the support with a solution containing a fluorinated functionalising agent; IV) heating the functionalised and fluorinated support of step c) under an inert gas and then under oxygen; V) retrieving an active fluorinated support. That activating support is used to activate a metallocene catalyst component for the polymerisation of olefins.

20 Claims, No Drawings

ACTIVATING SUPPORTS FOR METALLOCENE CATALYSIS

This invention relates to the field of activation of metallocene complexes, particularly in heterogeneous catalysis, to their method of preparation and to their use in the polymerisation of olefins.

The polymerisation of olefins in the presence of metallocene complexes has mostly been described in homogeneous catalysis. In that type of polymerisation, the catalyst, the olefin monomer and the resulting polymer are all present in the same liquid phase, typically a solvent.

These catalysts are however not adapted to heterogeneous polymerisation, such as suspension or gas phase polymerisation. These processes offer many advantages, among others, they allow the preparation of a polymer in granular form having a defined particles size distribution.

It is known in the art to (co)polymerise ethylene and alpha-olefins in the presence of a catalyst system comprising a metallocene catalyst component and an activating agent. As disclosed in Chen (Chen E., *Chem. Rev.*, 2000, 100, 1391) homogeneous activating agents range from simple aluminiumalkyls such as diethylaluminium chloride with $Cp_2TiCl_2$, to methylaluminoxarie (MAO) alone or modified, to perfluoroarylboranes, perfluoroarylalanes, perfluoroarylborates and perfluoroarylaluminates in combination with alkylating agents such as triisobutylaluminium.

These activators are costly, unstable and produce polymers that have a poor morphology, therefore incompatible with high yield processes in suspension or gas phase polymerisation. The catalytic system, i.e. the metallocene complex and its activator, must be supported on a solid support in order to be used in these polymerisation processes.

The most typical technique is to support onto solid supports, homogeneous activators such as MAO as described for example by Chien (*J. Polym. Sci., Part A: Pol. Chem.*, 1991, 29, 1603.), or by Collins (*Macromolecules*, 1992, 25, 1780), or by Soga (*Makromol. Chem.*, 1993, 194, 1745) or by Kaminsky (*Makromol. Chem. Rapid Commun.*, 1993, 14, 239) or such as perfluoroarylborates as described for example in U.S. Pat. No. 5,643,847 or such as perfluoroarylaluminates.

Polymers obtained with these systems have irregular grain size and have high apparent densities, thereby decreasing reactor fouling when compared to homogeneous polymerisation.

These catalytic systems using supported homogeneous activators are less active than equivalent homogeneous systems and the polymer properties are thereby degraded.

A new generation of solid activating supports has been developed and is described for example in Marks (*J. Am. Chem. Soc.*, 1998, 120, 13533): it concerns sulfated zircone particles or also by McDaniel (WO-9960033, WO-0123433, WO-0123434, WO-0144309, WO-0149747 et U.S. Pat. No. 6,548,441) or by Saudemont (FR-A-2765225). All these activators are solids having surface acid sites that are responsible for the activation.

These acid sites are metals combined with halides such as fluor or chlorine; metals can be selected from aluminium, titanium, zirconium or nickel.

The equivalent species in homogeneous catalysis are very poor activating species. Compounds such as dimethylaluminium fluoride (DMF) are used as activators in combination with triethylaluminium for the stereospecific polymerisation of propylene with compounds of the metallocene family with low productivity as described by Zambelli (*Macromolecules* 1989, 22, 2186). They do not activate metallocene complexes.

Patent application WO-0123433 claims a tri-component catalytic system comprising a compound of the metallocene family, an organoaluminium and a fluorinated silica-alumina acting as activator and obtained from a silica-alumina and a fluorinating agent. The surface acid sites are fluor and aluminium. The drawback of this invention resides in the site definition and in the use of a fluorinating agent.

Patent FR-A-2769245 also claims a tri-component system comprising a compound of the metallocene family pre-alkylated or not pre-alkylated, a co-catalyst that can be selected from alkykaluminium or oligomeric cyclic alkyl aluminoxane and a solid activating support having surface aluminium or magnesium acid sites of formula:

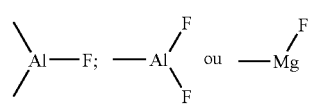

The method for preparing these supports comprises the steps of:
a) functionalisation of a porous mineral oxide with a functionalising agent based on aluminium and/or magnesium that reacts with the OH groups on the surface of the support;
b) thermal treatment under inert gas in a fluidised bed followed by a thermal treatment under oxygen;
c) fluorination with a fluorinating agent of the type $(NH_4)_2SiF_6$.

The preparation of the supports involves several steps: it is long and requires a separate fluorination step. In addition, it is necessary to use activating agents such as MAO in order to reach an acceptable activity. The use of MAO is detrimental to the morphology of the final polymer.

There is thus a need to develop activating supports based on aluminium and fluor, wherein the localisation on the surface is well defined as it is in FR-A-2769245 but with a reduced number of steps and wherein the activity is sufficient to suppress the need for an activating agent that degrades the polymer morphology.

It is an aim of the present invention to prepare activating supports having acid sites based on aluminium and fluor in defined amounts and wherein the fluor is directly linked to the aluminium, said activating supports being prepared with a single functionalising and fluorinating agent.

It is also aim of the present invention to disclose active catalyst systems that do not require an activating agent and have activity and productivity comparable to those of homogeneous systems.

It is another aim of the present invention to provide polymers having excellent polymer morphology.

It is yet another aim of the present invention to decrease reactor fouling.

Accordingly, the present invention discloses an activating support for metallocene complexes, combined with simple aluminium alkyls for the polymerisation of olefins. It is characterised in that it consists in support particles of solid catalytic components that are formed from at least a porous mineral oxide, said particles having been modified in order to carry surface acid sites based on aluminium and fluor. These sites are obtained by reacting support's surface OH groups with a unique functionalisation and fluorination agent comprising at least one aluminium atom, one fluor atom linked to the aluminium atom and a group that is reactive with the OH— groups. The support becomes an activating support after two thermal treatments: pyrolysis and combustion.

The counter anion of the active cationic complex may be constituted of a solid support preferably having a defined and controlled structure such as that of supports used in Ziegler-Natta catalysis. In order to enable the physical development of polymerisation, said support is functionalised to create surface acid sites that can effectively activate the metallocene complex.

Accordingly, the present invention discloses a method for preparing an activating support for metallocene complexes in the polymerisation of olefins comprising the steps of:
a) providing a support consisting in particles formed from at least one porous mineral oxide;
b) optionally fixing the rate of silanols on the surface of the support;
c) functionalising the support with a solution containing a fluorinated functionalising agent;
d) heating the functionalised and fluorinated support of step c) under an inert gas and then under oxygen;
e) retrieving an active fluorinated support.

The porous mineral oxides are advantageously chosen from silica, alumina and mixtures thereof, preferably, it is silica.

The porous mineral oxide particles preferably have at least one of the following characteristics:
they include pores having a diameter ranging from 7.5 to 30 nm;
they have a porosity ranging from 1 to 4 cm$^3$/g;
they have a specific surface area ranging from 100 to 1000 m$^2$/g; and
they have an average diameter ranging from 1 to 100 µm.

Before it is functionalised, the support has —OH radicals on its surface, in particular from 0.25 to 10, and even more preferably from 0.5 to 4 —OH radicals, per nm$^2$ resulting either from a thermal treatment under inert gas at a temperature of from 100 to 1000° C., preferably at a temperature of from 120 to 800° C. and more preferably at a temperature of from 140 to 700° C., during at least 60 minutes or from a chemical treatment. After it has been functionalised, said support has as many at least partially fluorinated aluminium and/or magnesium acid sites per nm$^2$.

The support may be of various kinds. Depending on its nature, its state of hydration and its ability to retain water, it may undergo dehydration treatments of greater or lesser intensity depending on the desired surface content of —OH radicals.

Those skilled in the art may determine, by routine tests, the dehydration treatment that should be applied to the support that they have chosen, depending on the desired surface content of —OH radicals.

More preferably, the starting support is made of silica. Typically, the silica may be heated between 100 and 1000° C., preferably between 120 and 800° C., more preferably between 140 and 700° C., under an inert gas atmosphere, such as for example under nitrogen or argon, at atmospheric pressure or under a vacuum of about 10$^{-5}$ bars, for a period of time of at least 60 minutes. For such heat treatment, the silica may be mixed, for example, with NH$_4$Cl so as to accelerate the dehydration.

Alternatively, the heat treatment can be carried out at a temperature of from 100 to 450° C., in combination with a silanisation treatment. This results in a species derived from silicon being grafted on the surface of the support thereby making said surface more hydrophobic.

The silane may, for example, be an alkoxytrialkylsilane, such as for example methoxytrimethylsilane, or a trialkylchlorosilane, such as for example trimethylchlorosilane or triethylchlorosilane. It is typically applied to the support by forming a suspension of this support in an organic silane solution, said silane solution having a concentration of between 0.1 and 10 mol per mole of OH radicals on the support. The solvent for this solution may be chosen from linear or branched aliphatic hydrocarbons, such as hexane or heptane, alicyclic hydrocarbons, optionally substituted, such as cyclohexane, and aromatic hydrocarbons, such as toluene, benzene or xylene. The treatment of the support by the silane solution is generally carried out under stirring at a temperature of from 50 to 150° C., during 1 to 48 hours.

After silanisation, the solvent is removed, for example, by siphoning or filtration, and the support is then being washed thoroughly, using for example 0.3 l of solvent per gram of support.

The fluorinated acid sites according to the present invention are formed by the reaction of —OH radicals carried by the support base particles with at least one functionalisation agent chosen from:
compounds comprising at least one aluminium, one fluor and one organic group that can react with the OH— groups. The organic group is preferably an hydrocarbon and most preferably an alkyl group having from 1 to 12 carbon atoms;
optionally in combination with any one or more compounds selected from MF, MR$^2$, M'F$_2$, M'R$^2$F, or M'R$^2{}_2$ wherein M is a group 1 metal of the Periodic Table (Handbook of Chemistry and Physics, 76th edition), M' is a group 2 metal of the Periodic Table and R$^2$ is an alkyl having from 1 to 20 carbon atoms.

Preferably, the fluorinated functionalisation agent is of formula (I)

$$Al\,(R^1)_2 F \qquad (I)$$

wherein the R$^1$ groups, can be the same or different and are linear or branched alkyl groups having from 1 to 20 carbon atoms. Preferably, R$^1$ is methyl, ethyl, butyl and hexyl, and more preferably the R$^1$ groups are the same.

This functionalising and fluorinating agents may be prepared as disclosed for example in Ziegler et al. (*Liebigs Ann. Chem.* 1954, 608, 1) or in patents brevets DE-A-1102151 and DE-A-1116660.

The most preferred compound of formula (I) is diethylaluminiumfluoride.

The functionalisation agent can be used alone or in combination with any one or more groups selected from MF, MR$^2$, M'F$_2$, M'R$^2$F or M'R$^2{}_2$ wherein M is a group 1 metal, preferably Na, M' is a group 2 metal, preferably Mg and R$^2$ is an alkyl group having from 1 to 20 carbon atoms.

In a preferred embodiment of the present invention, the functionalisation step is carried out by treating a suspension of the support particles in a solvent medium containing the functionalisation and fluorinating agent at a temperature ranging from −150 to +150° C. for a period of time ranging from 1 to 12 hours, and then by recovering the grafted particles after washing. The solvent is preferably selected from aliphatic, alicyclic and aromatic hydrocarbons. Preferably, the treatment is carried out at a temperature of from 20 to 100° C. and for a period of time of from 1 to 3 hours. Preferably the concentration of functionalisation and fluorinating agent is of from 0.5 to 20 mmol per g of support particles.

In the present invention, the thermal treatments described here-below are necessary to create a support having a sufficient level of acidity to activate the metallocene complex.

After the functionalisation step, a heat treatment under an inert gas (such as argon or nitrogen) is carried out, preferably in a fluidised bed, in order to eliminate the residual alkyl groups that may originate from the functionalisation agent. The heat treatment is used to remove the hydrocarbon groups present on the surface that have been created by the functionalisation and fluorinating agent. This heat treatment, or pyrolysis, is advantageously carried out at a temperature of from 200 to 600° C., preferably of from 350 to 500° C. and more preferably of about 450° C., for a period of time that depends upon the thickness of the bed to be treated and can vary from 1 hour for thin beds up to 2 days for thick beds. The present thermal treatment, carried out after the fluorination step, aims at destroying organic groups at the benefit of OH groups, contrary to that of the prior art FR-A-2769245 that is carried out before the fluorination step and aims at destroying the OH groups.

The oxidation treatment may advantageously consist of a heat treatment of the functionalised and fluorinated support particles, in a fluidised bed under oxygen or any other gas mixture comprising oxygen and an inert gas such as argon or nitrogen, at a temperature of from 200 to 600° C., preferably of from 350 to 500° C. and more preferably of about 450° C., for a period of time that also depends upon the thickness of the bed and can vary from 1 hour for thin beds to 2 days for thick beds. This treatment increases the acidity of the support surface and, consequently, the performance of the catalytic system.

The amount of aluminium and fluor present in the support at the end of the treatment are respectively of 0.5 to 7 wt %, preferably of from 2 to 5 wt % for the aluminium and of 0.2 to 5 wt %, preferably of from 1 to 3 wt % for the fluor.

The numbers of aluminium and fluor atoms per $nm^2$ after the two thermal treatments are respectively of 0.25 to 10 $Al/nm^2$, preferably of 0.5 to 4 $Al/nm^2$ and of 0.25 to 20 $F/nm^2$ preferably of 0.25 to 8 $F/nm^2$.

The activating supports of the present invention are characterised in that each fluor atom is directly linked to an aluminium atom and the distribution of fluor on the surface of the support is uniform. This is different from the situation disclosed in FR-A-2769245 wherein the fluor occurs in various combinations such as for example liked to Al, or directly linked to the surface Si as Si—F or as Si—OsiF3, or as Al—OsiF3.

The present invention further relates to a supported metallocene catalyst system for the polymerisation of olefins, comprising:

(a) a metallocene catalyst component that is optionally pre-alkylated;

(b) optionally an alkylating agent; and (c) an activating solid support for metallocene, prepared by the process as defined above, wherein the metallocene catalyst component is impregnated on the activating support before or after the optional alkylation treatment.

The alkylating agent may be absent if the metallocene complex has been pre-alkylated. The support may be impregnated before or after the optional pre-alkylabon treatment.

Components (a)(, b) and (c) may be introduced in any order that depends upon the subsequent polymerisation process.

The metallocene catalyst component (a) typically is a compound of formula (II):

MLx    (II)

wherein

M represents a transition metal belonging to Group 4 of the Periodic Table of Elements according to the Handbook of Chemistry and Physics, 76th edition;

L represents a ligand coordinated to the transition metal, at least one ligand L being a group having a cycloalkadienyl-type backbone and the ligands L are the same or different.; and x is equal to the valency of the transition metal, Preferably M is Ti, Zr or Hf.

The expression "group having a cycloalkadienyl-type backbone" should be understood to mean the cycloalkadienyl group itself or a substituted cycloalkadienyl group.

Preferably, a cycloalkadienyl group is a cyclopentadienyl group. Substituted cyclopentadienyl groups may include indenyl and fluorenyl groups.

When the compound of formula MLx contains at least two groups having a cycloalkadienyl-type backbone, at least two of these groups may be linked together by a divalent radical: this is a bridge imparting stereorigidity to the structure. Each divalent radical may be an alkylene radical, such as a methylene radical (—CR$_2$—), an ethylene radical (—CH$_2$ CH$_2$—) or a trimethylene radical (—CH$_2$—CH$_2$—CH$_2$—), said alkylene radical being unsubstituted or substituted, for example by at least one hydrocarbon group, such as for example the isopropylidene radical; the divalent radical may also be a silylene (—SiH$_2$) group, optionally substituted, for example by at least one hydrocarbon group. One can cite a dialkylsilylene radical such as for example dimethylsilylene, a diarylsilylene radical such as for example diphenylsilylene or an alkylarylsilylene radical such as for example methylphenylsilylene.

When a cycloalkadienyl group is substituted, the substituents are preferably selected from an alkyl group having from 1 to 20 carbon atom, or from an alkenyl, aryl or aralkyl group having from 2 to 20 carbon atoms. Two substituents which are located in adjacent positions on the same cycloalkadienyl ring may be linked together, forming an aromatic or non-aromatic ring condensed on said cycloalkadienyl ring. If the latter is a cyclopentadienyl ring, the resulting condensed cycle may be an indenyl, tetrahydroindenyl, fluorenyl or octahydrofluorenyl ring. Moreover, at least one ligand L may be chosen from: groups of formula:

—O—; —S—; —NR$^3$—; or —PR$^3$ wherein R$^3$ is hydrogen or a group selected from a silyl, alkyl or aryl groups, the latter two being optionally halogenated. One of this ligand's free valencies is linked to the transition metal M atom and the other free valency is linked to a structural bridge that is itself linked to a ligand L having a cycloalkadienyl backbone, thereby forming a half-sandwich structure; and groups of formula:

—OR$^4$; —SR$^4$; —N(R$^4$)$_2$; or —P(R$^4$)$_2$ wherein R$^4$ has the same meaning as R$^3$ hereabove. One of this ligand's free valency is linked to a structural bridge that is itself linked to a ligand L having a cycloalkadienyl backbone. The structural bridge may be any divalent radical as described hereabove.

Ligands L differing from those mentioned above may be chosen from:

hydrocarbon groups containing from 1 to 20 carbon atoms such as linear or branched alkyl groups such as for example methyl, ethyl, propyl, isopropyl and butyl, or cycloalkyl groups such as for example cyclopentyl and cyclohexyl, or aryl groups such as for example phenyl or alkaryl groups such as for example tolyl and aralkyl groups such as for example benzyl;

alkoxy groups such as for example methoxy, ethoxy, butoxy and phenoxy;
amine or amide groups;
phosphido groups;
halogens, such as for example fluorine, chlorine, bromine and iodine;
organometallic groups provided they do not affect the productivity of the final complex.

By way of example, the metallocene catalyst may be chosen from the following compounds:
bis(cyclopentadienyl)zirconium dichloride (Cp$_2$ ZrCl$_2$);
bis(indenyl)zirconium dichloride (Ind$_2$ ZrCl$_2$);
bis(n-butylcyclopentadienyl)zirconium dichloride [(n-but-Cp)$_2$ ZrCl$_2$];
ethylenebis(4,5,6,7-tetrahydro-1-indenyl)zirconium dichloride [Et(THInd)$_2$ZrCl$_2$];
ethylenebis(indenyl)zirconium dichloride [Et(Ind)$_2$ZrCl$_2$];
isopropylidene(cyclopentadienyl-fluorenyl)zirconium dichloride [iPr(Cp)(Flu)ZrCl$_2$];
isopropylidenebis(tert-butyl-cyclopentadienyl)zirconium dichioride [iPr(t-Bu-Cp)$_2$ ZrCl$_2$];
dimethylsilyl(3-tert-butyl-cyclopentadienyl-fluorenyl)zirconium dichloride [Me$_2$Si(3-t-Bu-Cp-Flu)ZrCl$_2$];
dimethylsilyl-bisindenyl-zirconium dichloride [Me$_2$Si(Ind)$_2$ ZrCl$_2$];
bis(cyclopentadienyl)dimethylzirconium (Cp$_2$ZrMe$_2$);
bis(indenyl)dimethylzirconium, (Ind$_2$ZrMe$_2$);
ethylenebis(4,5,6,7-tetrahydro-1-indenyl)dimethylzirconium [Et(THI)$_2$ZrMe$_2$];
ethylenebis(indenyl)dimethylzirconium [Et(Ind)$_2$ZrMe$_2$];
isopropylidene(cyclopentadienyl-fluorenyl)dimethylzirconium [iPr(Cp-Flu) ZrMe$_2$];
dimethylsilyl(3-tert-butylcyclopentadienyl-fluorenyl)dimethylzirconium [Me$_2$Si(3-t-Bu-Cp-Flu) ZrMe$_2$];
bis(cyclopentadienyl)diphenylzirconium (Cp$_2$ZrPh$_2$);
bis(cyclopentadienyl)dibenzylzirconium (Cp$_2$ZrBz$_2$);
dimethylsilyl(tetramethylcyclopentadienyl-tert-butylamino) zirconium dichloride [Me$_2$Si(Me$_4$-Cp-t-but-N)ZrCl$_2$];
dimethylsilyl(tetramethylcyclopentadienyl, tert-butylamino) dimethyltitanium, [Me$_2$Si(Me$_4$-Cp-t-but-N)TiMe$_2$];
bis(cyclopentadienyl)titanium dichloride (CP$_2$TiCl$_2$);
ethylenebis(4,5,6,7-tetrahydro-1-indenyl)titanium dichloride[Et(Ind)$_2$TiMe$_2$];
ethylenebis(indenyl)dichlorotitanium [Et(Ind)$_2$TiCl$_2$];
isopropylidene(cyclopentadienyl-fluorenyl)dichlorotitanium [iPr(Cp-Flu)TiCl$_2$];
dimethylsilyl(3-tert-butylcyclopentadienyl-fluorenyl)titanium dichloride [Me$_2$Si(3-t-Bu-Cp-Flu)TiCl$_2$];
bis(cyclopentadienyl)dimethyltitanium (Cp$_2$TiMe$_2$);
ethylenebis(4,5,6,7-tetrahydro-1-indanyl)dimethyltitanium [Et(THI)2 TiMe$_2$];
ethylenebis(indenyl)dimethyltitanium [Et(Ind)$_2$TiMe$_2$];
isopropylidene(cyclopentadienyl, fluorenyl)dimethyltitanium [iPr(Cp-Flu) TiMe$_2$];
dimethylsilyl(3-tert-butylcylopentadienyl-fluorenyl)dimethyltitanium [Me$_2$Si(3-t-Bu-Cp-Flu) TiMe$_2$];
dimethylsilyl(tetramethylcyclopentadienyl, tert-butylamino) titanium dichloride [Me$_2$Si(Me$_4$-Cp-t-Bu-N)TiCl$_2$].

The alkylating agent is an organometallic compound or a mixture thereof that is able to transform a metal-L group bond into a metal-carbon bond or a metal-hydrogen bond. It can be selected from an alkylated derivative of Al, Li or Mg or Zn. Preferably, it is selected from an alkylated derivative of aluminium of formula (III)

$$AlR^5{}_n X_{3-n} \quad (III)$$

wherein the R$^5$ groups, may be the same or different, and are a substituted or unsubstituted alkyl, containing from 1 to 12 carbon atoms such as for example ethyl, isobutyl, n-hexyl and n-octyl, X is a halogen or hydrogen and n is an integer from 1 to 3, with the restriction that at least one R$^5$ group is an alkyl. It can also be any organometallic compound able to create a metal-carbon bond provided it does not interfere with the activity of the final catalytic system.

Preferably, the alkylating agent is an aluminium alkyl, and more preferably it is triisobutylaluminium (TIBAL) or triethylaluminium (TEAL).

At variance with French patent FR-A-2769245, the alkylating agent of formula IV

wherein R$^5$ is as disclosed for compounds of formula III is excluded. Compounds of formula IV are oligomeric cyclic alkylaluminoxanes such as for example methylaluminoxane (MAO).

In the final supported metallocene catalytic system, the amounts of alkylating agent and of metallocene complex are such that the molar ratio Al/M is of from 1 to 10000 and the amount of activating support is of 0.01 to 2000 mg of support per micromole of metallocene complex.

One of the main advantages of the present invention is that it does not require the use of aluminoxane in order to activate the metallocene component and thereby avoids the drawbacks of danger and polymer morphology associated with the use of aluminoxane.

This invention also discloses a method for preparing a supported catalyst system that comprises the steps of
a) providing a functionalised and fluorinated support prepared according to the present invention;
b) subjecting the support of step a) to a thermal treatment under inert gas;
c) subjecting the support of step b) to a thermal treatment under oxygen;
d) dissolving a metallocene catalyst component, optionally pre-alkylated in an organic solvent;
e) optionally providing an alkylating agent;
f) impregnating the solution of step d) and optionally the alkylating agent of step e) onto the support either simultaneously or in any order;
g) retrieving an active supported catalyst system.

The metallocene catalyst component may be pre-impregnated on the activator support. This pre-impregnation may be carried out as follows.

The activating support is suspended, with the metallocene, in a solvent chosen from aliphatic, alicyclic or aromatic hydrocarbons. The operation is carried out at a temperature of from 0 to 140° C. for a period of from 1 hour to 10 hours. The amount of metallocene component is of from 0.01 to 20 wt % based on the total weight of the activating support. The mixture is decanted in order to remove the supernatant liquid. The support is then washed several times, at a temperature of from 20 to 140° C. with a quantity of solvent of from 20 to 300 ml per gram of support.

Optionally and if necessary, the metallocene component (a) may be subjected to an alkylation treatment. If the activating support is pre-impregnated with the metallocene component (a), this alkylation treatment may take place either before or after the pre-impregnation.

The alkylation treatment of the metallocene complex, pre-impregnated or not, if present, may be carried out using an alkylating agent of formula III or a mixture thereof. It may be carried out as follows.

The metallocene component or the impregnated solid support are placed in a Schlenk tube conditioned under standard conditions, typically containing from 10 to 50 ml of a solvent per gram of support or per 10 milligrams of metallocene complex, said solvent being selected from aliphatic, alicyclic or aromatic hydrocarbons. The mixture is brought to a temperature ranging between −100 and 0° C. An amount of from 1 to 10000 equivalents of alkylating agent per mole of metallocene component is then added. The reaction mixture is then brought back slowly to room temperature. The complete operation can be instantaneous or last up to 72 hours depending upon the metallocene complex. The alkylated metallocene complex pre-impregnated on the support may be washed as described for the pre-impregnation step and then dried under vacuum for 72 hours.

The present invention also discloses a method for homo- or co-polymering olefins that comprises the steps of:
a) providing the supported metallocene catalyst system described here-above;
b) injecting a monomer and an optional comonomer;
c) maintaining under polymerisation conditions;
d) retrieving a polymer.

The present invention relates to a process for homopolymerising or copolymerising olefins, in suspension or in condensed phase or in the gas phase, in the presence of the supported metallocene catalyst system defined hereabove.

The olefins that can be polymerised (homopolymerisation and copolymerisation) with the catalyst system according to the present invention are, for example, the olefins containing from two to twenty carbon atoms and, preferably alpha.-olefins of this group. More preferably ethylene, propylene, 1-butene, 4methyl-1-pentene, 1-octene, 1-hexene, 3-methyl-1-pentene, 3-methyl-1-butene, 1-decene and 1-tetradecene, or mixtures thereof can be used. Most preferably, the olefin is ethylene or propylene.

The polymerisation process may be carried out in suspension as follows. A suspension of the catalytic system in an inert medium, such as an aliphatic hydrocarbon, is introduced into a reactor. The concentration of the metallocene component (a) is of from 0.25 to 20 µmol/l, that of the optional alkylating agent (b) if present is of from 0.01 to 5 mmol/ll and the amount of activating solid support is from 0.5 to 1000 mg/l. The suspension may remain under stirring from a period of time ranging from 5 to 60 minutes either at room temperature (about 25° C.) or at polymerisation temperature. The olefin or olefins are then introduced at a pressure ranging from 1 to 250 bar and the (co)polymerisation is carried out at a temperature of from −20 to 250° C. for a period of time ranging from 5 minutes to 10 hours.

Preferred aliphatic hydrocarbon can be selected from n-heptane, n-hexane, isohexane, isopentane or isobutane.

The preferred polymerisation conditions are as follows:
pressure ranging from 0.5 to 60 bar
temperature ranging from 10° C. to a temperature slightly below the melting point of the polymer, typically 5° C. below the melting point of the polymer.

The polymerisation process may be carried out in condensed phase as follows: olefins are injected at a temperature of from 10 to 110° C. and under a pressure of from 1 to 60 bars, where they are in condensed phase, with part of the alkylating agent acting as a scavenger in the reactor. The metallocene complex is impregnated on the activating support in the presence of the remaining alkylating agent. The catalytic system is introduced in the reactor either by injection, or as a suspension in a small volume of aliphatic or alicyclic or aromatic hydrocarbon, or dry.

The polymerisation process may be carried out in the gas phase as follows. The olefin or olefins are injected into the reactor at a pressure ranging from 1 to 60 bars, at a temperature ranging from 10 to 110° C. The reactor may be a stirred tank or a fluidised bed reactor. The metallocene catalyst component has been impregnated onto the activating support in the presence of the optional alkylating agent The catalytic system is introduced into the reactor either by direct injection or by impregnation of a solid charge that is then injected into the reactor.

The polymerisation processes may involve a chain-transfer agent to control the melt flow index of the polymer to be produced. Hydrogen is typically used as the chain-transfer agent, and it is introduced in an amount that can range up to 20 mole % and preferably ranges from 0.01 to 10 mole % in terms of total moles of the olefin/hydrogen combination injected into the reactor.

The supported catalytic systems according to the present invention offer number of advantages.

The catalytic system has high activity and productivity that compare favourably with those obtained in homogeneous catalysis but they do not require activation agents such as MAO or perfluoroarylboranes or perfluoroarylborates in combination with alkylaluminium.

The polymers obtained according to the present invention have a number average molecular weight Mn, a weight average molecular weight Mw and a polydispersity index D defined as the ratio Mw/Mn that are comparable to those obtained in homogeneous metallocene catalysis. The polydispersity D is of less than 5, preferably of from 2 to 4.

The polymers obtained according to the present invention are characterised by an isocomposition and a homogeneous distribution of comonomer chains, comparable to those obtained in homogeneous metallocene catalysis.

The iso- or syndio-specific polymerisation of alpha-olefins such as propylene with metallocene complexes having respectively a $C_2$ or $C_s$ symmetry are not affected by the presence of the activating support they are comparable to those obtained in homogeneous metallocene catalysis.

The polymers obtained according to the present invention are under the form of very full regular grains having a high apparent density. Such excellent morphology was impossible to obtain with the prior art metallocene catalyst systems using methylaluminoxane as activating agent. In order to further improve and control the morphology of the final polymer, it is recommended to carry out a pre-polymerisation in suspension or preferably in gas phase and then introduce the pre-polymer particles in the selected (co)polymerisation process. The level of pre-polymerisation depends upon the subsequent polymerisation process.

The catalytic system according to the present invention excludes the use of MAO. The activating supports are thus stable and can be stored for very long periods of time.

Reactor fouling is substantially reduced because the polymer particles have controlled morphology.

The invention will now be illustrated by way of examples that do not limit its scope.

EXAMPLES

All the examples were carried out under argon using the classical Schienk techniques. The solvents heptane and toluene were dried on a 3 angström molecular sieve.

In these examples, the number average molecular weight Mn, the weight average molecular weight Mw and the polydispersity D=Mw/Mn were determined by Steric Exclusion Chromatography (SEC) with trichlorobenzene (TCB) as solvent at a temperature of 135° C., with a polystyrene calibration and with Mark-Houwink coefficients $K=5.25.10^4$ dl/g and $\alpha=0.76$ for polyethylene.

Tacticity and comonomer incorporation were determined by $^{13}$CNMR analysis that was carried out on a Varian 300 MHz equipment with a mixture 5:1 of trichlorobenzene/deutero-benzene, at a temperature of 135° C.

Productivities were expressed in grams of (co)polymer per gram of catalyst wherein the mass of the catalyst includes the mass of the activating support and that of the metallocene compound: they were considered as zero when they were inferior to $10^2$ g/g.

Example 1

Preparation of the Activating Support

The activating support of the present invention has been prepared as follows. A silica support sold by Grace Davisson under the name Grace 332® was used as starting material. It had a the following specifications:
- specific surface area=300 m²/g.
- mean particle size=70 μm;
- porous volume=1.65 mL/g;
- apparent density=0.35 g/cm³

Step A.

5 g of the silica were treated under dynamic vacuum ($10^{-2}$ mbar) according to the following temperature program:
- heated from 30 to 100° C. in one hour,
- heated from 100 to 130° C. in 30 minutes;
- heated from 130 to 450° C. in one hour;
- maintained at a temperature of 450° C. for 4 hours.

This treatment provided silica with an amount of surface silanol of about 1.3 mmol/g.

Step B.

In a 250 mL tri-necked flask equipped with a mechanical stirrer, 2.32 g of the treated silica were suspended in 100 mL of anhydrous toluene. This suspension was treated during a period of time of one hour, at room temperature (about 25° C.) with 15 mL of diethylaluminiumfluor (DEAF) (0.6 M in toluene), representing about 3 mole equivalent of DEAF with respect to silanol. 100 mL of toluene were added thereafter, the solution was then stirred for 10 minutes and decanted in order to remove the supernatent This washing step was repeated three times. After the last washing step, the impregnated support was dried under dynamical vacuum ($10^{-2}$ mbar) during one hour.

Step C.

The support was then treated in a fluidised bed under argon according to the following temperature program:
- heated from 30 to 130° C. in one hour;
- maintained at a temperature of 130° C. during one hour;
- heated from 130 to 450° C. in one hour;
- maintained at a temperature of 450° C. during 4 hours.

Step D.

This thermal program under argon was followed by a second identical thermal program under oxygen.

Elemental analysis of the support using inductively coupled plasma (ICP) technique combined with mass spectroscopy gave respective amounts of aluminium and fluor of 4.56% Al and 2.21% F.

Example 2

Polymerisation of Ethylene

To a one liter flask conditioned under argon containing 500 mL of heptane, 0.85 mL of trilsobutylaluminium (TIBAL) (20% solution in heptane) were added. A part of that solution having a concentration of 2 mM in TIBAL was used to suspend 33 mg of the activating support of Example 1. The whole suspension was then injected with a canula in the remaining solution. 280 μL of a solution of 1.8 mM of ethylene-bisindenyl zirconium dichloride in toluene (0.5 μmole or 1 μmole/l) were injected in the solution with a micro-syringe. 6 mL of 1-hexene were then injected to this reactive medium with a canula and the system was manually stirred at room temperature for a period of time of about 5 minutes and then syringed in a one-liter Büchi type reactor. The polymerisation was carried out at a temperature of 80° C. under a pressure of 10 bars of ethylene. After a polymerisation time of one hour, the polymer was filtered, washed with methanol and dried under vacuum. 45 g of polymer were retrieved thereby giving a productivity of 820 g of polymer per gram of support.

The polymer obtained was characterised as follows:
- Mn=95500 g/mol
- Mw=312300 glmol;
- polydispersity index D=3.3;
- fusion temperature Tm=110° C.

Example 3

Polymerisation of Propylene

Using a glove box, 4 mL of TIBAL (10% solution in heptane) and 3.5 mg of dimethylsilyl-bis(2-methyl-4,5-benzoindenyl) zirconium dichloride were contacted in a 5 cm³ syringe. That solution was then deposited onto 360 mg of the activating support of example 1. The support instantaneously turned yellow while the supernatent remained colourless. After a period of time of 5 minutes, the suspension was injected in a 3.5 L Büchi type reactor containing liquid propylene at a temperature of 70° C. Polymerisation was carried out during a period of time of one hour and 252 g of isotactic polypropylene were retrieved, thereby giving a productivity of 700 grams of polymer per gram of catalyst. The polymer obtained was characterised as follows:
- melt flow index MI2=3.13 g/10 min as measured using the method of standard test ASTM D 1238 under a load of 2.16 kg and at a temperature of 230° C.;
- bulk density d=0.432 g/cm³ as measured by the method of standard test ASTM D 1505 at a temperature of 23° C.;
- Mn=79500 g/mol;
- Mw of 303000 g/mol,
- polydispersity index D=3.8;
- fusion temperature=145.7° C.;
- mmmm pentad determined by $^{13}$C NMR=96%

Example 4

Comparative

The support material of the first example was used but it was not subjected to all steps A through D.

Comparative Example 4a

To a one liter flask conditioned under argon and containing 300 mL of heptane, 0.28 mL of triisobutylaluminium (TIBAL) (20% solution in heptane) were added. A part of the solution representing 1 mmole of TIBAL was used to suspend 36 mg of the activating support prepared as in Example 1, step A. The whole suspension was then injected with a canula in the remaining solution. $150.10^{-6}$ L of a solution 1.2 mM of ethylene-bisindenyl zirconium dichloride in toluene ($0.5.10^{-6}$ mole) were injected in the solution with a micro-syringe. 6 mL of 1-hexene were then injected into the reactive medium with a canula and the system was manually stirred at room temperature for a period of time of about 5 minutes and then syringed into a one-liter Büchi type reactor. Polymerisation was then carried out at a temperature of 80° C. under an ethylene pressure of 3 bars and for a period of time of one hour.

After a period of time of one hour and after precipitation in methanol, no trace of polymer was obtained and the totality of the activating support was recovered.

Comparative Example 4b

To a one liter flask conditioned under argon and containing 300 mL of heptane, 0.28 mL of triisobutylaluminium (TIBAL) (20% solution in heptane) were added. A part of the solution representing 1 mmole of TIBAL was used to suspend 36 mg of the activating support prepared as in Example 1, steps A and B. The whole suspension was then injected with a canula in the remaining solution. $150.10^{-6}$ L of a solution 1.2 mM of ethylene-bisindenyl zirconium dichloride in toluene ($0.5.10^{-6}$ mole) were injected in the solution with a micro-syringe. 6 mL of 1-hexene were then injected into the reactive medium with a canula and the system was manually stirred at room temperature for a period of time of about 5 minutes and then syringed into a one-liter Büchi type reactor. Polymerisation was then carried out at a temperature of 80° C. under an ethylene pressure of 3 bars and for a period of time of one hour.

After a period of time of one hour and after precipitation in methanol, no trace of polymer was obtained and the totality of the activating support was recovered.

Comparative Example 4c

To a one liter flask conditioned under argon and containing 300 mL of heptane, 0.28 mL of triisobutylaluminium (TIBAL) (20% solution in heptane) were added. A part of the solution representing 1 mmole of TIBAL was used to suspend 36 mg of the activating support prepared as in Example 1, steps A through C. The whole suspension was then injected with a canula in the remaining solution. $150.10^{-6}$ of a solution 1.2 mM of ethylene-bisindenyl zirconium dichloride in toluene ($0.5.10^{-6}$ mole) were injected in the solution with a micro-syringe. 6 mL of 1-hexene were then injected into the reactive medium with a canula and the system was manually stirred at room temperature for a period of time of about 5 minutes and then syringed into a one-liter Büchi type reactor. Polymerisation was then carried out at a temperature of 80° C. under an ethylene pressure of 3 bars and for a period of time of one hour.

After a period of time of one hour and after precipitation in methanol, no trace of polymer was obtained and the totality of the activating support was recovered.

The invention claimed is:

1. A process for the preparation of an activated support suitable for supporting a metallocene complex comprising:
   a) providing a particulate support material comprising particles of a porous mineral oxide;
   b) contacting said porous mineral oxide particles with a fluorinated functionalizing agent to provide functionalized support particles;
   c) heating said functionalized support particles in an inert atmosphere and at an elevated temperature sufficient to effect pyrolysis of said support particles;
   d) subjecting the pyrolysed support particles of subparagraph c) to an oxidizing treatment in the presence of an oxygen containing gas at an elevated temperature effective to oxidize said support particles; and
   e) recovering active fluorinated support particles after said oxidizing treatment.

2. The method of claim 1 wherein said mineral oxide support particles are selected from the group consisting of alumina and silica particles.

3. The method of claim 2 wherein said support particles comprises silica.

4. The method of claim 3 wherein said support particles are heated in subparagraph c) to a temperature in the range of 200-600° C.

5. The method of claim 4 wherein said support particles are heated in subparagraph c) to a temperature within the range of 350-500° C.

6. The method of claim 3 wherein said fluorinated functionalizing agent comprises a dialkyl aluminium fluoride.

7. The method of claim 6 wherein said dialkyl aluminium fluoride is characterized by the formula $$Al(R^1)_2F \qquad (I)$$

wherein the $R^1$ groups can be the same or different and are linear or branched alkyl groups having from 1 to 20 carbon atoms.

8. The method of claim 7 wherein the $R^1$ groups are the same and are methyl, ethyl, isopropyl or linear or branched butyl groups.

9. The method of claim 6 wherein said dialkyl aluminium fluoride is diethylaluminiumfluoride.

10. The method of claim 3 wherein said fluorinated functionalizing agent comprises a fluoroorganoaluminum compound.

11. The method of claim 10 wherein said fluorinating agent comprises a mixture of said fluoroorganoaluminum compound and co-agent selected from the group consisting of MF, $MR^2$, $M'F_2$, $M'R^2F$, and $M'R^2_2$ wherein M is a metal from group 1 of the Periodic Table, M' is a metal from group 2 of the Periodic Table and $R^2$ is an alkyl group having from 1 to 20 carbon atoms.

12. The method of claim 10 wherein said porous mineral oxide is silica having a specific surface area within the range of 100 to 1,000 $cm^2/g$.

13. The method of claim 12 wherein said silica has a porosity within the range of 1-4 cm³/g, a pore diameter within the range of 7.5-30 nm and an average particle size within the range of 1-100 um.

14. An activated fluorinated support produced by the process of claim 10 comprising aluminium atoms having fluorine atoms which are directly linked to said aluminium atoms.

15. A supported metallocene catalyst system comprising the activated support of claim 14 and a metallocene catalyst component supported on said support.

16. The supported metallocene catalyst system of claim 15 wherein said metallocene comprises at least one cyclopentadienyl group coordinated with a transition metal from group 4 of the Periodic Table of Elements.

17. The supported metallocene catalyst system of claim 16 further comprising an alkylating agent characterized by the formula:

$$AlR^5{}_nX_{3-n}$$

wherein the $R^5$ groups may be the same or different and are each a substituted or unsubstituted alkyl groups containing from 1 to 12 carbon atoms, X is halogen or hydrogen and n is an integer from 1 to 3.

18. The supported metallocene catalyst system of claim 17 wherein said alkylating agent is triethylaluminium or tri-isobutylaluminium.

19. A method for preparing a supported metallocene catalyst system comprising:
   a) providing an activated fluorinated support as defined by claim 14;
   b) dissolving a metallocene catalyst component in an organic solvent to provide a solution of said metallocene catalyst component in said organic solvent;
   c) impregnating said activated fluorinated support with said solution of metallocene catalyst component; and
   d) recovering a supported catalyst system incorporating said metallocene catalyst compound and said activated fluorinated support.

20. The method of claim 19 comprising providing an alkylating agent characterized by the formula:

$$AlR^5{}_nX_{3-n}$$

wherein the $R^5$ groups may be the same or different and are each a substituted or unsubstituted alkyl group, containing from 1 to 12 carbon atoms, X is halogen or hydrogen and n is an integer from 1 to 3;

contacting said support with said alkylating agent either concomitantly with or separately from the contact of said support with said metallocene component.

* * * * *

UNITED STATES PATENT AND TRADEMARK OFFICE
CERTIFICATE OF CORRECTION

| | | |
|---|---|---|
| PATENT NO. | : 7,759,271 B2 | |
| APPLICATION NO. | : 10/587058 | |
| DATED | : July 20, 2010 | |
| INVENTOR(S) | : Floran Prades et al. | |

It is certified that error appears in the above-identified patent and that said Letters Patent is hereby corrected as shown below:

On the title page of the Patent:

(73) add --Centre National de la Recherche Scientifique, Paris (FR)--.

Signed and Sealed this
Second Day of August, 2011

David J. Kappos
*Director of the United States Patent and Trademark Office*